United States Patent
Kawasaki (10) Patent No.: US 9,041,963 B2
(45) Date of Patent: May 26, 2015

(54) IMAGE FORMING APPARATUS CAPABLE OF PERFORMING PRINTING PROCESSING, METHOD OF CONTROLLING THE SAME, AND RELATED STORAGE MEDIUM

(71) Applicant: CANON KABUSHIKI KAISHA, Tokyo (JP)

(72) Inventor: Hiroki Kawasaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/072,986

(22) Filed: Nov. 6, 2013

(65) Prior Publication Data

US 2014/0160522 A1 Jun. 12, 2014

(30) Foreign Application Priority Data

Dec. 10, 2012 (JP) ................................. 2012-269780

(51) Int. Cl.
   G06F 3/12 (2006.01)
   H04N 1/32 (2006.01)
   G06K 15/02 (2006.01)

(52) U.S. Cl.
   CPC ............ *G06F 3/1236* (2013.01); *G06F 3/1213* (2013.01); *G06F 3/1285* (2013.01); *H04N 1/32* (2013.01); *G06K 15/18* (2013.01)

(58) Field of Classification Search
   None
   See application file for complete search history.

(56) References Cited

U.S. PATENT DOCUMENTS

| 5,727,134 A * | 3/1998 | Higuchi et al. ................. 358/1.1 |
| 7,769,916 B2 * | 8/2010 | Nakanishi ....................... 710/14 |
| 7,788,397 B1 * | 8/2010 | Schultz et al. ................. 709/233 |
| 2013/0250797 A1 * | 9/2013 | Itoh ............................... 370/252 |

FOREIGN PATENT DOCUMENTS

JP   2001-057581 A   2/2001

* cited by examiner

*Primary Examiner* — Jeremiah Bryar
(74) *Attorney, Agent, or Firm* — Fitzpatrick, Cella, Harper & Scinto (57) ABSTRACT

An image forming apparatus, a method of controlling it and a storage medium. The apparatus detects a level of a load on the CPU, and selects, when a communication request is received, a communication mode corresponding to the communication request from a plurality of communication modes in accordance with a level of the load on the CPU detected levels of the loads on the CPU for communication modes stored in a storage unit. The apparatus communicates with a device that issued the communication request in accordance with the selected communication mode.

7 Claims, 7 Drawing Sheets

| NO. | COMMUNICATION MODE | COMMUNICATION USE | PREDICTED TRANSFER RATE | CPU OCCUPATION RATE APPLICATION RANGE |
|---|---|---|---|---|
| 1 | TCP COMMUNICATION | HIGH LOAD PROCESSING PRECEDENCE | 10MB/sec | 100% - 70% |
| 2 | MULTI-SESSION COMMUNICATION (3 SESSIONS) | COMMUNICATION SPEED PRECEDENCE | 30MB/sec | <= 50% |
| 3 | MULTI-SESSION COMMUNICATION (5 SESSIONS) | COMMUNICATION SPEED PRECEDENCE | 50MB/sec | <= 20% |
| 4 | MULTI-SESSION COMMUNICATION (7 SESSIONS) | COMMUNICATION SPEED PRECEDENCE | 70MB/sec | <= 10% |
| 5 | SECURE COMMUNICATION | SAFETY PRECEDENCE | 10MB/sec | <= 20% |

FIG. 6

FIG. 7

IMAGE FORMING APPARATUS CAPABLE OF PERFORMING PRINTING PROCESSING, METHOD OF CONTROLLING THE SAME, AND RELATED STORAGE MEDIUM

BACKGROUND OF THE INVENTION

1. Field of the Invention

The present invention relates to an image forming apparatus, a method of controlling the same, and a storage medium.

2. Description of the Related Art

In recent years, techniques for speeding up communication in order to improve usability are improving. Amongst conventional techniques, there are communication devices capable of communicating by a plurality of communication modes and capable of selecting a communication mode out of the plurality of communication modes and performing data communication. When data communication is performed using such communication devices, a user of the communication device selects, before the communication, the communication mode considering the transfer data size and the communication environment, or in accordance with the communication performance (see Japanese Patent Laid-Open No. 2001-57581, for example). After setting the selected communication mode on the communication device, a request to receive data or a data transmission is made to a communication destination.

Meanwhile, it is predicted that high volume data communication will increase for image forming apparatuses, and it is thought that the above described techniques for speeding up communication will become necessary.

However, there are communication modes that are characterized by being capable of very high speed communication but putting a high load on the CPU. In a case where such a communication mode is employed, the load on the CPU increases, and, for example, in the case of an image forming apparatus, when print processing is performed simultaneously with the communication, problems occur such as the print processing speed decreasing, or the communication rate decreasing.

When an image forming apparatus is executing print processing, for example, and another terminal transmits data to the image forming apparatus by a high speed communication mode via a network, the load for the high speed communication is further added to the high load for print processing on the CPU of the image forming apparatus. For this reason, situations occur in which the print processing is unable to be completed within the originally expected time.

SUMMARY OF THE INVENTION

An aspect of the present invention is to eliminate the above-mentioned problems with the conventional techniques.

A feature of the present invention is to provide a technique in which communication is performed having selected a communication mode in accordance with processing being executed on the image forming apparatus when a communication request is received.

According to an aspect of the present invention, there is provided an image forming apparatus capable of communicating via a network by a plurality of communication modes. The apparatus comprises a control unit configured to control operation of the image forming apparatus; a storage unit configured to store a level of a load on the control unit at which to apply a communication mode for each of the plurality of communication modes; a detection unit configured to detect a level of a load on the control unit; a selection unit configured to select, when a communication request is received, a communication mode from the plurality of communication modes, in accordance with the level of the load on the control unit detected by the detection unit and the levels of the loads on the control unit at which to apply the communication modes stored in the storage unit; and a communication unit configured to communicate with a device that issued the communication request in accordance with the communication mode selected by the selection unit.

According to another aspect of the present invention, there is provided an image forming apparatus capable of communicating via a network by a plurality of communication modes. The apparatus comprises a control unit configured to control operation of the image forming apparatus; a storage unit configured to store information for determining a level of a load on the control unit at which to apply a communication mode for each of the plurality of communication modes; a detection unit configured to detect a level of a load on the control unit; a selection unit configured to select, when a communication request is received, a communication mode from the plurality of communication modes, in accordance with the information for determining the level of the load on the control unit detected by the detection unit and the levels of the loads on the control unit at which to apply the communication mode stored in the storage unit; and a communication unit configured to communicate with a device that issued the communication request in accordance with the communication mode selected by the selection unit.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will be described hereinafter in detail, with reference to the accompanying drawings. It is to be understood that the following embodiment(s) are not intended to limit the scope of the claims of the present invention, and that not all of the combinations of the aspects that are described according to the following embodiment(s) are necessarily required with respect to the means to solve the problems according to the present invention.

Figure 1:
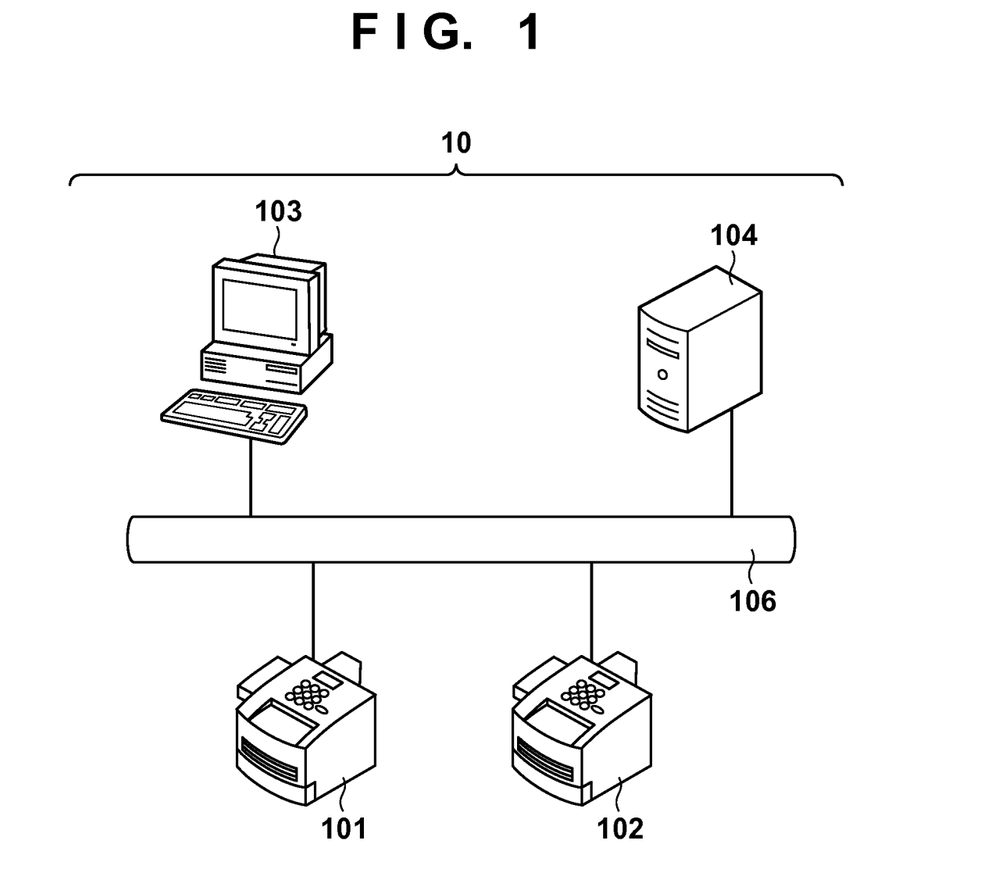
FIG. 1 is a configuration diagram of a printing system according to an embodiment of the present invention.

FIG. 1 is a configuration diagram of a printing system according to an embodiment of the present invention.

In FIG. 1, an image forming apparatus 101, an image forming apparatus 102, a client computer 103, and a file server 104 are connected via a network 106 in an intranet 10. Note, hereinafter the numeral 101 will be used to represent the image forming apparatus. The client computer 103 instructs a desired image forming apparatus to print. The file server 104 is capable of being accessed from the image forming apparatus 101, and the image forming apparatus 101 can make a request to the file server 104 for transmission of data. The file server 104 is shown as a computer terminal, but, for example, an image forming apparatus may also assume the role of the file server. Note, in FIG. 1, only one intranet is shown, but it is also possible that multiple intranets having similar configuration to the intranet 10 exist, or that an intranet is connected to the Internet. Also, the number of image forming apparatuses, client computers and servers may be larger than shown in FIG. 1.

Figure 2:
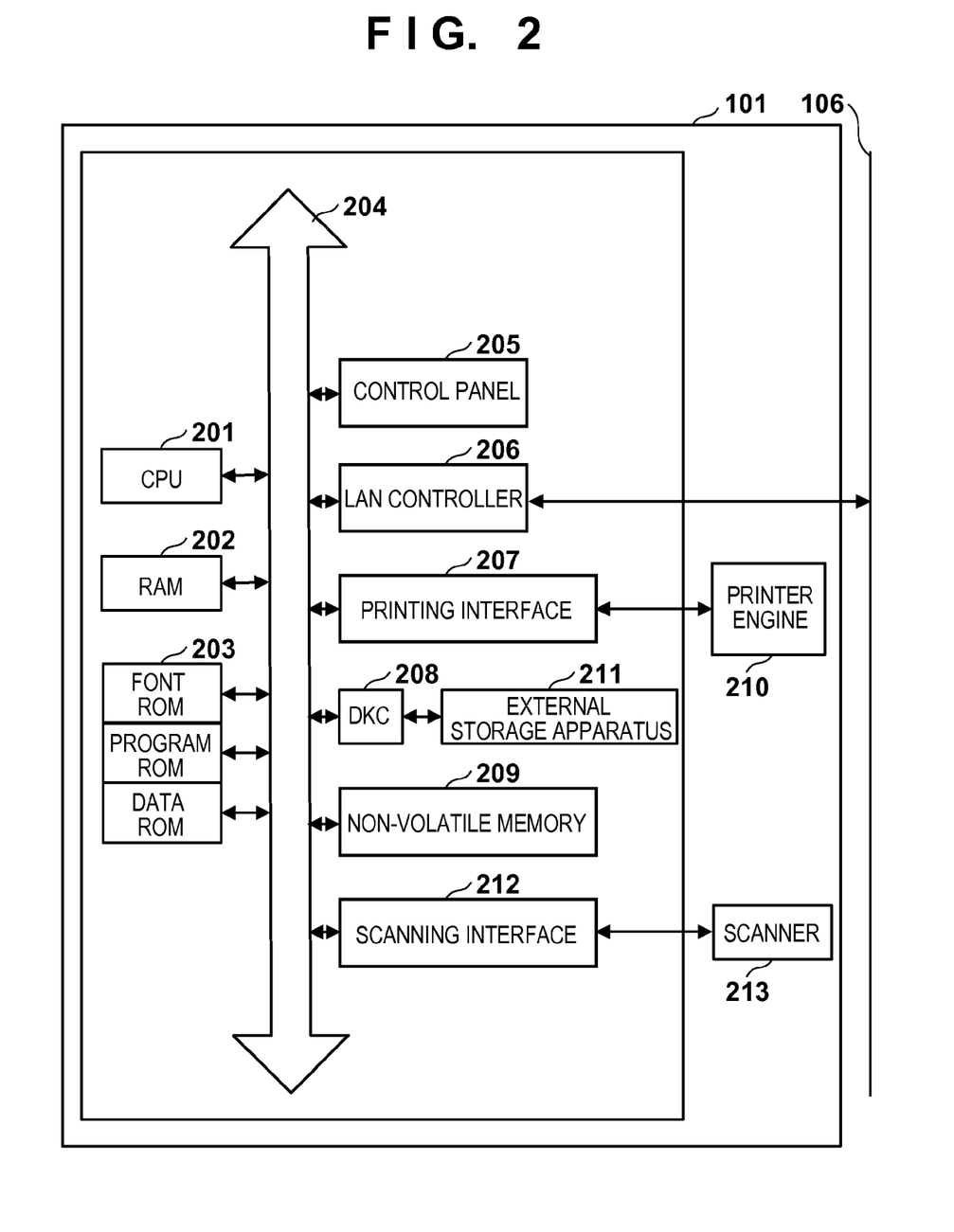
FIG. 2 is a block diagram for showing a hardware configuration of an image forming apparatus according to the embodiment.

FIG. 2 is a block diagram for showing a hardware configuration of an image forming apparatus 101 according to the embodiment. Note, explanation of an example of a case where the image forming apparatus 101 is a copying machine (multi function peripheral) is given.

A CPU 201 performs overall control of various devices connected to a system bus 204 based on a control program stored in a program ROM of a ROM 203 or in an external storage apparatus 211. Also, image signals are output to a printing unit (printer engine) 210 connected via a printing interface 207, and image signals input from a scanning unit (scanner) 213 connected via a scanning interface 212 are processed. Also, control programs executable by the CPU 201, and the like, are stored in the program ROM of the ROM 203. Furthermore, a font ROM of the ROM 203 stores font data, and the like (including outline font data), and a data ROM of the ROM 203 stores information used by the client computer, and the like. The CPU 201 is capable of performing communication processing with the client computer 103 and the image forming apparatuses on the network 106 via a LAN controller 206. A RAM 202 mainly functions as a main memory and a work area of the CPU 201, and is configured so that the memory capacity can be expanded by an option RAM being connected to an expansion port (not shown). Also, the RAM 202 is used as a loading area for information output to a control panel 205 or the printer engine 210, or the like, or as a storage area for environment data.

Access to the external storage apparatus 211 which may be a hard disk (HDD), an IC card, or the like, is controlled by a disk controller (DKC) 208. The external storage apparatus 211 stores application programs, font data, form data and the like, and is used as a job storage area to temporarily spool print jobs, and externally control spooled jobs. Furthermore, the external storage apparatus 211 is used as a BOX data storage area that maintains, in a BOX region, image data input from the scanner 213 and print job image data as BOX data, which is referenced from the network 106 and printed. In the present embodiment, it is assumed that an HDD is used as the external storage apparatus 211, which maintains various logs such as job logs and image logs. With the control panel 205, the user is capable of inputting various information via software keys. No limitation is put on the number of the previously described external storage apparatus 211, and configuration may be taken so that multiple external memories for storing multiple option font cards for adding to the embedded fonts, and external memories for storing programs to interpret printer control languages of different languages can be connected. A non-volatile memory 209 stores, in a non-volatile manner, various setting information set by the user using the control panel 205. Furthermore, various expansion apparatuses such as a finisher for performing functions such as stapling and sorting, and a double-sided printing apparatus for realizing a double-sided printing function, are optionally mountable (not shown) to the image forming apparatus 101, and operation of these is controlled by the CPU 201.

Figure 3:
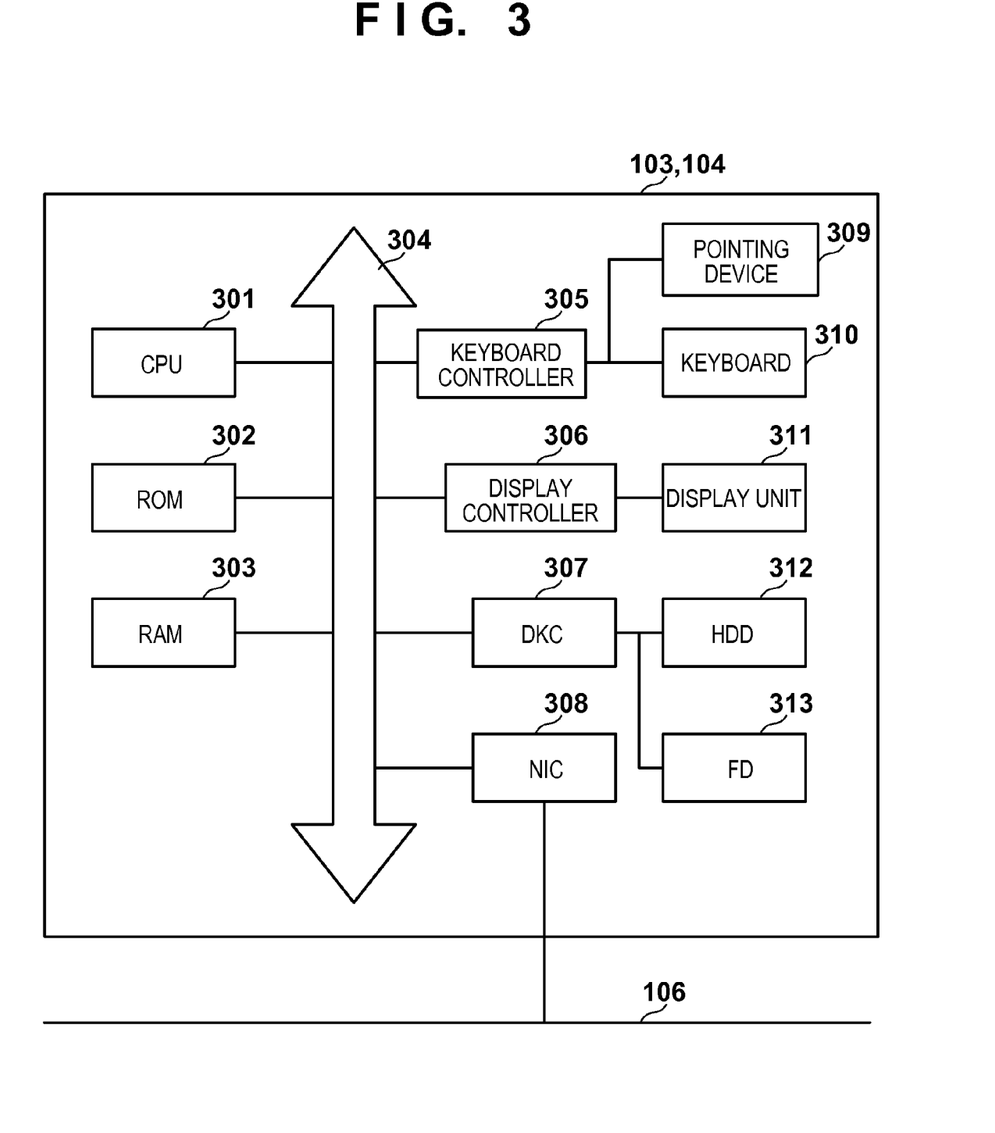
FIG. 3 is a block diagram for showing a hardware configuration of a client computer and a file server according to the embodiment.

FIG. 3 is a block diagram for showing a hardware configuration of a client computer 103 and a file server 104 according to the embodiment.

A CPU 301 controls various devices connected on a system bus 304. A ROM 302 stores a BIOS, a boot program and the like. A RAM 303 is used as a main storage apparatus of the CPU 301. A keyboard controller (KBC) 305 performs processing for inputting information from a pointing device 309 and a keyboard 310. A display controller 306 has internal video memory, and renders to this video memory in accordance with an instruction from the CPU 301, and also outputs image data rendered to the video memory as a video signal to a display unit 311. A disk controller (DKC) 307 controls access to a hard disk (HDD) 312 and to a floppy (registered trademark) disk 313. A network interface card (NIC) 308 connects to the network 106 and performs information communication via the network 106. Note, an OS and various application programs that operate on the OS are stored in the HDD 312. In the above configuration, when an electric power of the apparatus is turned on, the OS is read from the HDD 312 into the RAM 303 in accordance with the boot program stored in the ROM 302 of the CPU 301, and the apparatus functions as an information processing apparatus such as a PC or as a server.

Figure 4:
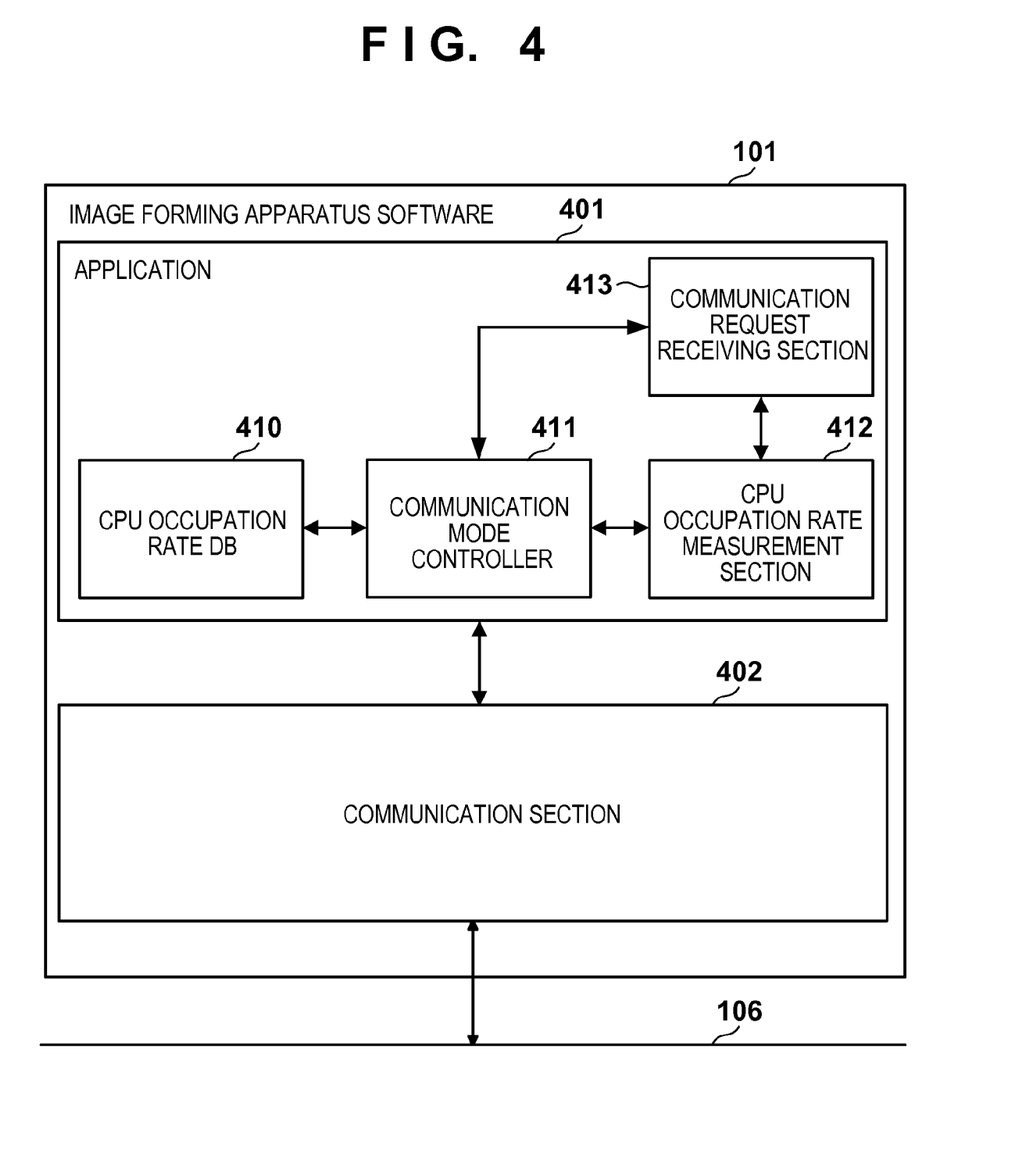
FIG. 4 is a block diagram for showing a software configuration of the image forming apparatus according to the embodiment.

FIG. 4 is a block diagram for showing a software configuration of the image forming apparatus 101 according to the embodiment. The software configuration of the image forming apparatus 101 can be largely separated into an application 401 that operates in user space and a communication section 402 that performs external communication.

Firstly, explanation will be given for the application 401. A communication request receiving section 413 is executed by the CPU 201 and determines whether or not a communication request was sent to the image forming apparatus 101. Communication requested with the communication request is as follows. Firstly, this communication is for image data to be scanned by the scanner 213 of the image forming apparatus 101 and transmitted to the client computer 103 through the intranet 10. Also, communication for receiving print data transmitted from the client computer 103 is included. Note, configuration may be taken so that when the image forming apparatus 101 exchanges data by communicating with other devices, notification is made to the CPU 201 via the communication request receiving section 413 using all communication requests.

The communication request receiving section 413, having determined that a communication request was received, notifies a CPU occupation rate measurement section 412 that the communication request was received, and sends communication content in notification to a communication mode controller 411. The CPU occupation rate measurement section 412 measures an occupation rate of the CPU 201 in the image forming apparatus 101 when notification of the communication request is received. This corresponds to detecting a level of a load on the CPU 201 in the image forming apparatus 101. A measuring method for this, is a method to, for example, add up a usage time during which the CPU 201 is used by a process for a unit time, and dividing this by a total amount of time. However, the measuring method of the occupation rate of the CPU 201 is not limited to this, and other methods may also be employed.

When the CPU occupation rate measurement section 412 finishes measuring the occupation rate of the CPU at this point, it notifies the communication mode controller 411 of the measurement result. When the communication mode controller 411 receives the CPU occupation rate, it references a CPU occupation rate DB 410, and considering the current CPU occupation rate, selects a communication mode so as not to cause the CPU 201 to perform processing that will overload it. Here information stored in the CPU occupation rate DB 410 includes such things as a range of the occupation rate of the CPU at which to apply the communication mode, and a predicted transfer rate.

Figure 5:
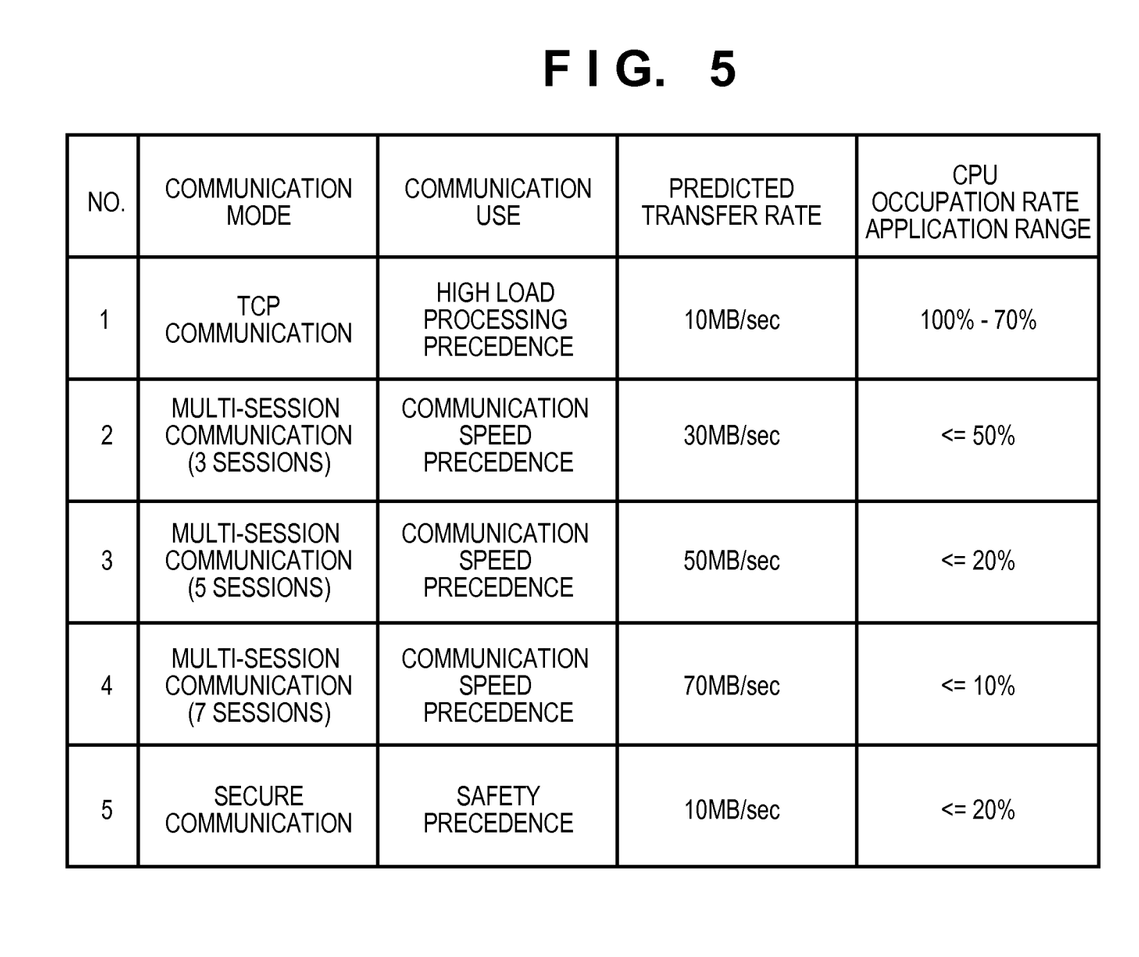
FIG. 5 is a view for showing an example of data of a CPU occupation rate DB according to the embodiment.

FIG. 5 is a view for showing an example of data of a CPU occupation rate DB 410 according to the embodiment.

As shown in FIG. 5, in correspondence with the communication modes, a predicted transfer rate due to the communication mode, and a range of the occupation rate of the CPU (information for determining a level of a load on the CPU) at which the communication mode is to be applied are associated and registered in the CPU occupation rate DB 410. Note, in the embodiment, the CPU occupation rate DB 410 stores the range of the occupation rate of the CPU as the information for determining the level of the load on the CPU used when applying a communication mode associated with the communication mode. However, the present invention is not limited to this and, for example, CPU load information of the communication modes such as a predicted occupation rate for the communication mode may also be registered in the CPU occupation rate DB 410 associated with the communication mode. In such as case, for example, if processing having an occupation rate of the CPU of 80% is executing, a communication mode having CPU load information less than or equal to 20% is selected.

In the embodiment, for example, when the image forming apparatus 101 is currently performing print processing, and the occupation rate of the CPU 201 is exceeding 80%, the CPU 201 is in a high load state. In such a case, the CPU occupation rate DB 410 is referenced, and a search is performed for a communication mode which is to be applied in a CPU occupation rate range greater than or equal to 80%. For example, in the example of FIG. 5, the communication mode that would be selected is TCP communication, which is to be applied in an occupation rate range of the CPU from 70% to 100%. With this, it is possible to avoid print processing delays due to a communication processing load.

Meanwhile, in a case where the image forming apparatus 101 is not performing high load processing, when, for example, the image forming apparatus 101 is in an idle state and the occupation rate of the CPU 201 is less than 10%, a communication mode having fast communication rate is selected. For example, in the example of FIG. 5, the communication mode that would be selected is multi-session communication (7 sessions), which is to be applied in an occupation rate range of the CPU less than or equal to 10%.

In this way, by referencing the CPU occupation rate DB 410, a communication mode can be selected that gives priority to the communication rate or gives priority to the currently executing processing in accordance with the occupation rate of the CPU 201. Furthermore, in a case where, for example, the occupation rate of the CPU 201 is low, communication can be performed in conformance with the communication request with a communication mode giving priority to the communication rate or with a communication mode giving priority to security. Here, based on FIG. 5, explanation was given for cases in which the occupation rate of the CPU 201 is 80% or greater and less than 10%, but the present invention is not limited to this. Configuration may be taken to set the communication mode to use in accordance with more smaller occupation rates of the CPU in the CPU occupation rate DB 410 such as a communication mode for when the occupation rate of the CPU 201 is between 30% and 40%, and a communication mode for when the occupation rate is between 50% and 70%, for when FAX is being used, for example.

In general, in the image forming apparatus, the occupation rate of the CPU 201 is high when print processing, scan processing or image processing is being performed, and in such cases, while this depends on the image forming apparatus, the occupation rate of the CPU is often greater than or equal to 80%.

Note, in FIG. 5, only the CPU occupation rate and the transfer rate are shown for each communication mode, but information indicating conditions based on the communication environment such as for when performing long distance cloud communication and for when performing local area communication, for example.

Next, explanation will be given for the communication section 402. The communication section 402 interprets an IP header, a TCP header, a UDP header, or the like, and has multiple communication modes for performing packet control of data communication between the application 401 and the external host. In order to avoid obstruction of currently executing high load processing as much as possible the communication modes are largely divided into communication modes giving priority to high load processing that prioritize high load processing being executed, and communication modes giving priority to the communication request that prioritize the communication mode requested in the communication request. The communication modes giving priority to high load processing are communication modes that have lower loads on the CPU 201, and generally have slower communication rates than communication modes giving priority to the communication rate. An example of a communication mode that gives priority to high load processing is TCP communication, which is used for general communication. In TCP communication, by having a session between a server and a client, one-to-one communication is possible. The occupation rate of the CPU 201 when performing communication with this communication mode is often about 10% depending on the environment. A communication mode that gives priority to the communication request is, for example, multi-session communication, which prioritizes communication rate, and a communication mode that gives priority to security is secure communication.

Multi-session communication is a communication mode that increases the number of sessions of TCP communication which was given as an example of a communication mode giving priority to high load processing. Because in the multi-session communication, using a plurality of sessions, data is exchanged in parallel, high speed data transfer is possible. However, because information processed in parallel increases, the occupation rate of the CPU increases for the communication processing. In a case where high speed communication is requested in the communication request, and in a case where the communication time will be long such as, for example, when there is a high volume data transfer, or when the communication is over a long distance, a communication mode prioritizing communication rate is requested. Also, in multi-session communication, it is possible to dynamically change the number of sessions, and the occupation rate of the CPU changes based on the number of sessions. If the number of sessions is large, the transfer rate increases, but the occupation rate of the CPU also increases. For this reason, information may be stored for each number of sessions in multi-session communication in the CPU occupation rate DB 410. The occupation rate of the CPU in multi-session communication is often around 80% for five sessions in a local area network environment, for example.

Secure communication is communication, such as SSL (Secure Socket Layer), in which information is encrypted and the level of security is high. For encryption and decryption processing, a high load is placed on the CPU 201, and so when secure communication is performed, the occupation rate of the CPU necessarily increases. However, this kind of communication mode is requested in cases where the content of the communication request requires security; for example in cases of exchange of confidential documents or personal information. The occupation rate of the CPU due to secure communication using SSL, is often about 90% in, for example, a local area network environment. Note, because the establishment of security in communication may be set to have a higher priority than that of print processing, there are cases in which secure communication prioritizing security is required even during high load processing.

Also, configuration may be taken so as to provide the communication mode controller 411 with a function capable of confirming whether or not the communication destination terminal supports the communication mode selected based on the information in the CPU occupation rate DB 410 and communication is possible using the communication mode. In other words, in cases where the communication destination terminal does not support the selected communication mode, another communication mode is selected, and determination of whether or not the communication mode is supported is repeated until communication with the terminal becomes possible.

Note, in the previously described embodiment, the explained communication mode was given as an example, but configuration may be taken so that for the communication mode, wired communication or wireless communication units, and not just for protocols and high level applications, are included.

Figure 6:
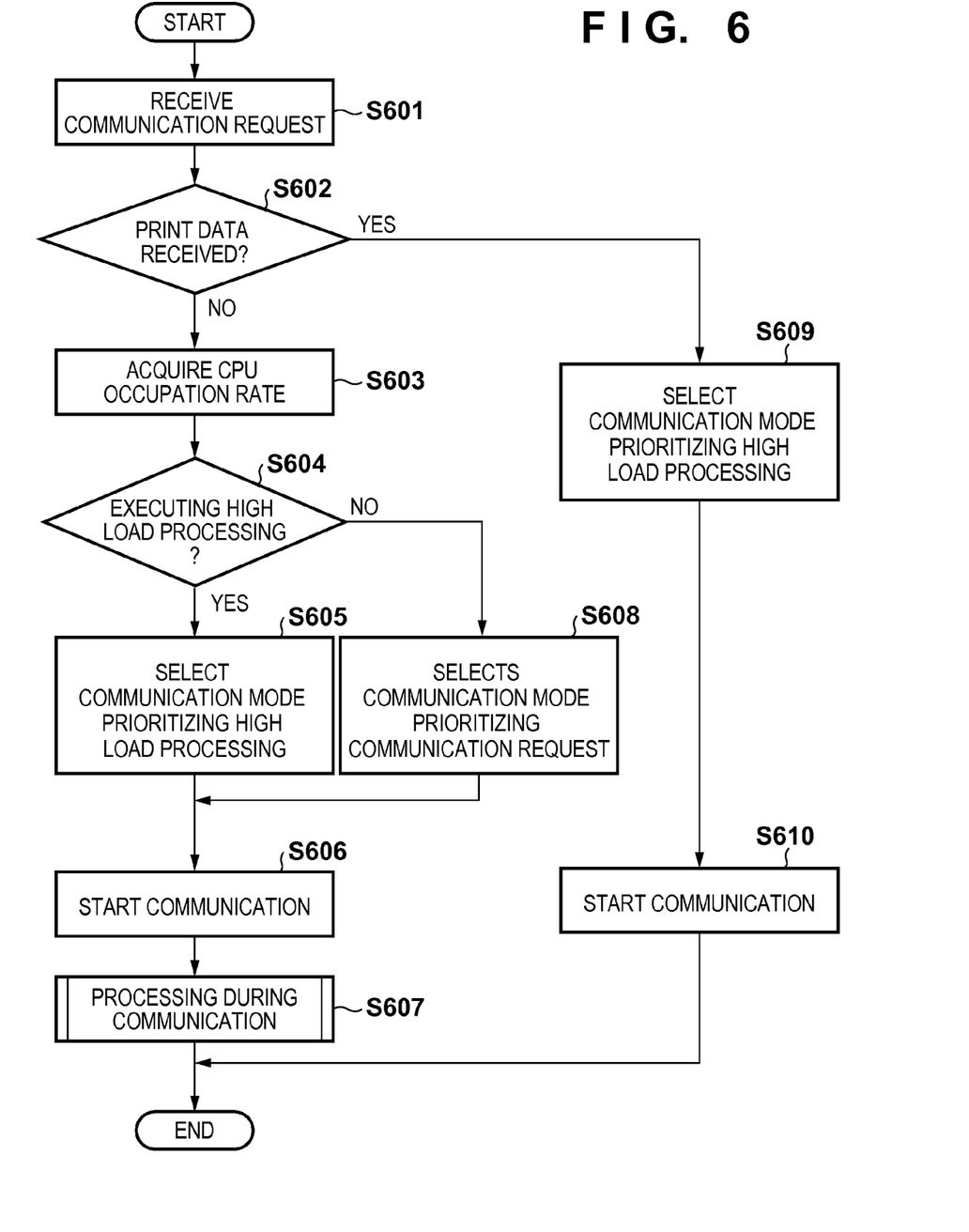
FIG. 6 is a flowchart for describing processing when the image forming apparatus receives a communication request according to the embodiment.

FIG. 6 is a flowchart for describing processing when the image forming apparatus 101 receives a communication request according to the embodiment. This processing may be realized by storing a program for executing this flowchart in the ROM 203 and by the CPU 201 reading out and executing this program. However, explanation of each processing step here is based on the software configuration of FIG. 4.

Firstly, in step S601, when the communication request receiving section 413 receives a communication request it reports to the CPU occupation rate measurement section 412 that it received the communication request. Next, the processing proceeds to step S602, and the communication request receiving section 413 determines the content of the communication request, and determines whether or not print data is received from the client computer 103. In a case where print data is not received, the request may be a FAX transmission request or a transmission request for document data stored in the external storage apparatus 211 of the image forming apparatus 101. Also, receiving print data may be, for example, the receiving of data used in a protocol, wherein the image forming apparatus 101 performs print processing, such as a RAW printing protocol, simultaneously to the data being received.

In step S602, when the communication request receiving section 413 determines that print data is not received, the processing proceeds to step S603, and the CPU occupation rate measurement section 412 measures the current occupation rate of the CPU 201 of the image forming apparatus 101, and sends the measurement result in notification to the communication mode controller 411. Next, the processing proceeds to step S604, and the communication mode controller 411 determines whether or not the image forming apparatus 101 is executing high load processing, i.e. whether or not processing placing a high load on the CPU 201 is being executed. In a case where high load processing such as, for example, print processing is being executed, the processing proceeds to step S605. In step S605, the communication mode controller 411, referencing the CPU occupation rate DB 410, selects a communication mode giving priority to high load processing that the communication destination device that made the communication request can handle (support), in order to avoid obstructing the currently executing print processing as much as possible. After that, the communication mode controller 411 sends content of the communication request in notification to a function (program) that executes the communication mode giving priority to high load processing selected in step S605. Next, the processing proceeds to step S606, and the CPU 201 initiates communication using the selected communication mode, and then executes the communication processing in step S607.

Meanwhile, in a case where, in step S604, the communication mode controller 411 determines that high load processing is not being executed, the processing proceeds to step S608, and the communication mode controller 411, referencing the CPU occupation rate DB 410, selects a communication mode giving priority to the communication request which performs communication in accordance with the communication request. Here, a communication mode which either gives priority to communication rate or to security of the communication is selected in accordance with the communication request. After this, the processing proceeds to step S606 and communication is initiated using the selected communication mode giving priority to the communication request. After the communication is initiated, the processing proceeds to step S607, and processing during communication is performed.

When, in step S602, it is determined that print data is received, the processing proceeds to step S609 and the communication mode controller 411, referencing the CPU occupation rate DB 410, selects a communication mode giving priority to high load processing that the communication destination device can handle (support), so as not to obstruct the currently executing print processing. Next, after sending content of the communication request to a function (program) that executes the communication mode, the processing proceeds to step S610, and using the communication mode selected in step S609, the communication is initiated. By this, the image forming apparatus 101 is able to execute the communication processing while executing the print processing without reducing the printing speed.

Figure 7:
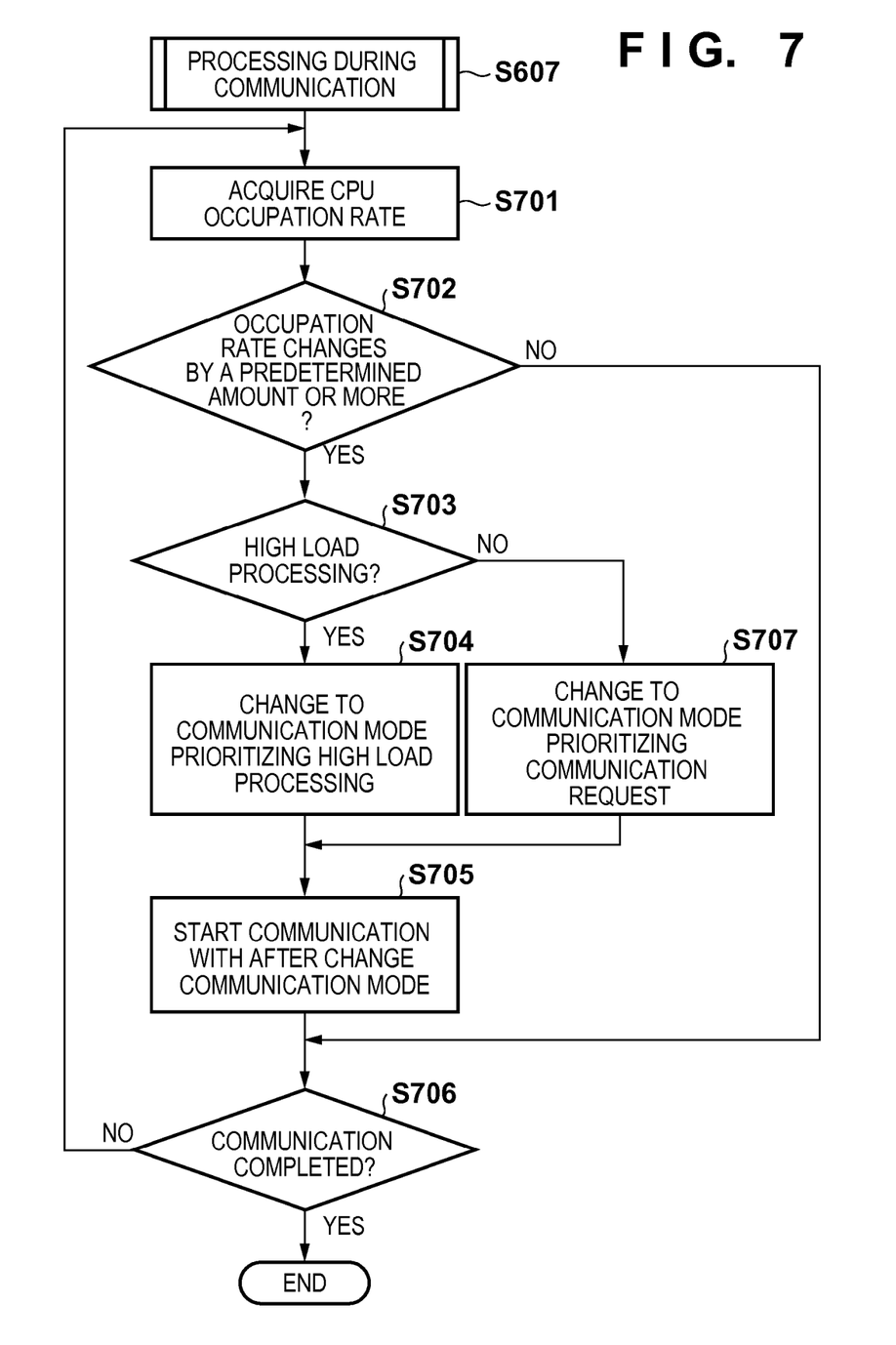
FIG. 7 is a flowchart for describing processing during communication in step S607 of FIG. 6.

FIG. 7 is a flowchart for describing processing during communication in step S607 of FIG. 6.

After communication initiation, firstly, in step S701, the CPU occupation rate measurement section 412 once again acquires the current occupation rate of the CPU 201 in the image forming apparatus 101. Next, the processing proceeds to step S702, and the communication mode controller 411 determines whether or not the occupation rate of the CPU 201 acquired in step S701 as compared to the previously acquired occupation rate changes by greater than or equal to a predetermined amount. In a case where it is determined that the occupation rate did not change by greater than or equal to a predetermined amount from the previous time (for example, a case where the difference was less than or equal to 10%), the processing proceeds to step S706, and the CPU 201 determines whether or not communication completed. Here, when it is determined that communication completes, the processing returns to step S701, and this flow loops until the communication completes.

On the other hand, in a case where, in step S702, it is determined that the occupation rate of the CPU 201 changes by greater than or equal to a predetermined amount as compared to the previous time (for example, a case where the occupation rate of the CPU dropped from 90% to 20%), the processing proceeds to step S703, and the CPU 201 determines whether or not high load processing is being executed. The processing of step S703 is similar processing to the processing of step S604 in the previously described FIG. 6, and the image forming apparatus 101 determines whether or not high load processing is executing. Here, for example, in a case where the occupation rate of the CPU 201 dropped to 20% from 90% and the processing reached step S703, the processing proceeds to step S707, and the communication mode is changed from one giving priority to high load processing, to a communication mode giving priority to the communication request (prioritizing communication rate or prioritizing security). After that, the processing proceeds to step S705, and using the changed communication mode, communication is initiated.

As an example, it is assumed that during data transmission and receiving by TCP communication which is a communication mode giving priority to high load processing for printing, the printing completed. Because the print processing completed, the occupation rate of the CPU 201 drops greatly, and the communication mode is switched, by the processing of step S707, to multi-session communication which is a communication mode giving priority to the communication request, and communication is performed at a high speed from the continuation from the preceding communication.

Also, similarly, in a case where transition was made from a low load state to a state in which high load processing is executed, such as when, during communication by multi-session communication in an idle period, print processing is started, in step S702 the occupation rate of the CPU 201 rises by greater than or equal to a predetermined amount. Then, the processing proceeds to step S703, it is determined that high load processing is executing, the processing proceeds to step S704 and communication is continued after changing to a communication mode giving priority to the high load processing.

By executing the above explained processing, because control is made so that communication processing by a high load communication mode is not executed when processing placing a large load on the CPU such as, for example, print processing, and a drop in speed in the high load processing that is executing (for example, print processing) due to the communication processing can be prevented.

Also, because, in a case where the load on the CPU is not high, because communication can be performed by a communication mode that gives priority to, for example, communication rate, or gives priority to security in accordance with the received communication request, there is the effect that communication processing corresponding to the communication request is executed.

Furthermore, in a case where a load on the CPU drops because, for example, print processing completes during communication, it is possible to immediately switch to and communicate with a communication mode giving priority to communication rate or giving priority to security. For this reason, there is an effect that dynamic communication control can be executed in accordance with fluctuations in the load of the processing in the image forming apparatus.

Furthermore, in a case where the load on the CPU increases such as when, for example, print processing was initiated during communication, it is possible to switch to and communicate with a communication mode that prioritized the currently executing processing. For this reason, there is an effect that dynamic communication control can be executed in accordance with fluctuations in the load of the processing in the image forming apparatus.

Next, a case in which print data (RAW printing protocol) is received from the client computer 103 when the image forming apparatus 101 according to the present embodiment of the present invention is on waiting, and printing is performed will be explained with reference to the flowchart of FIG. 6. In other words, a case in which it is determined, in step S602, that content of the communication request received in step S601 is the receipt of print data.

As explained above, in step S601, the communication request receiving section 413 confirms receipt of the communication request, and inspects the content of the received communication request. Then, in step S602, the communication request receiving section 413 determines whether or not the content of the received communication request is a receipt of print data. In a case where data transmitted from the client computer 103 is transmitted by the RAW printing protocol, i.e. a case of a print data receipt request, the communication request receiving section 413 reports to the communication mode controller 411 performance of print data receipt. The, the processing proceeds to step S609, and the communication mode controller 411 references the CPU occupation rate DB 410, and selects a communication mode that will not obstruct print processing, that the communication destination is capable of supporting, and that prioritizes high load processing. Then, after notifying a program that realizes the communication mode function of the content of the selected communication request, the processing proceeds to step S610, and the communication is initiated using the communication mode selected in step S609. With this, the image forming apparatus 101 performs the print processing while simultaneously receiving the print data.

In a case when print data is received, print processing is executed in parallel to communication processing, when an error does not occur. In such a case, because the print processing, i.e. the processing that places a high load on the CPU 201, is performed in parallel to the communication processing, after initiating the communication of step S610, the flow completes without the processing during communication of step S607 being performed. This is because the print processing does not complete before the communication when the print data is received. For this reason, transition is not made from high load processing to low load, and the change in communication mode as in step S707 and step S704 of FIG. 7 is not performed.

By the above explained present embodiment, before communication processing is initiated, determination is made as to whether print data is received and simultaneously printing is performed, and in such a case communication processing by a communication mode prioritizing high load processing is initiated. With this, there is an effect that it is possible to prevent the load on the CPU due to the communication processing causing the print processing speed to decrease.

Note, in the present embodiment, the example of the print data being sent by the RAW printing protocol was given, but configuration may be taken so that data is received by a different printing protocol such as, for example, LPR protocol or WSD protocol.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-269780, filed Dec. 10, 2012, which is hereby incorporated by reference herein in its entirety.

What is claimed is:

1. An image forming apparatus capable of performing printing processing, the image forming apparatus comprising:
   a communication unit configured to perform a communication with an external apparatus on a network;
   an accepting unit configured to accept a communication request;
   a determining unit configured to determine whether or not the image forming apparatus is performing the printing processing; and
   a controlling unit configured to control so that, in a case where the accepting unit accepts the communication request and the determination unit determines that the image forming apparatus is not performing the printing processing, the communication unit performs a communication, based on the communication request accepted by the accepting unit, using multi-session communication, in which data is transmitted in parallel using a plurality of sessions with the external apparatus,
   and so that, in a case where the accepting unit accepts the communication request and the determination unit determines that the image forming apparatus is performing the printing processing, the communication unit performs a communication, based on the communication request accepted by the accepting unit, without using the multi-session communication.

2. The image forming apparatus according to claim 1, wherein the controlling unit controls so that, when the accepting unit accepts the communication request and the determination unit determines that the image forming apparatus is performing the printing processing, the communication unit performs the communication, based on the communication request accepted by the accepting unit.

3. An image forming apparatus capable of performing printing processing, the image forming apparatus comprising:
   a determining unit configured to determine whether or not the image forming apparatus is performing the printing processing; and
   a controlling unit configured to, in a case where the determination unit determines that the image forming apparatus is not performing the printing processing, permit performance by the image forming apparatus of multi-session communication, in which data is transmitted in parallel using a plurality of sessions with an external apparatus, and configured to, in a case where the determination unit determines that the image forming apparatus is performing the printing processing, not permit performance by the image forming apparatus of the multi-session communication.

4. A method of controlling an image forming apparatus capable of performing printing processing, the method comprising:
   performing a communication with an external apparatus on a network;
   accepting a communication request;
   determining whether or not the image forming apparatus is performing the printing processing; and
   controlling so that, in a case where the communication request is accepted in the accepting and it is determined in the determining that the image forming apparatus is not performing the printing processing, a communication, based on the communication request, is performed using multi-session communication, in which data is transmitted in parallel using a plurality of sessions with the external apparatus,
   and so that, in a case where the communication request is accepted in the accepting and it is determined in the determining that the image forming apparatus is performing the printing processing, a communication, based on the communication request, is performed without using the multi-session communication.

5. A non-transitory computer-readable storage medium storing a program for causing a computer to function as an image forming apparatus capable of performing printing processing, the image forming apparatus comprising:
   a communication unit configured to perform a communication with an external apparatus on a network;
   an accepting unit configured to accept a communication request;
   a determining unit configured to determine whether or not the image forming apparatus is performing the printing processing; and
   a controlling unit configured to control so that, in a case where the accepting unit accepts the communication request and the determination unit determines that the image forming apparatus is not performing the printing processing, the communication unit performs a communication, based on the communication request accepted by the accepting unit, using multi-session communication, in which data is transmitted in parallel using a plurality of sessions with the external apparatus,
   and so that, in a case where the accepting unit accepts the communication request and the determination unit determines that the image forming apparatus is performing the printing processing, the communication unit performs a communication, based on the communication request accepted by the accepting unit, without using the multi-session communication.

6. A method of controlling an image forming apparatus capable of performing printing processing, the method comprising:
   determining whether or not the image forming apparatus is performing the printing processing; and
   controlling to, in a case where it is determined in the determining that the image forming apparatus is not performing the printing processing, permit performance by the image forming apparatus of multi-session communication, in which data is transmitted in parallel using a plurality of sessions with an external apparatus,
   and to, in a case where it is determined in the determining that the image forming apparatus is performing the printing processing, not permit performance by the image forming apparatus of the multi-session communication.

7. A non-transitory computer-readable storage medium storing a program for causing a computer to function as an image forming apparatus capable of performing printing processing, the image forming apparatus comprising:
- a determining unit configured to determine whether or not the image forming apparatus is performing the printing processing; and
- a controlling unit configured to, in a case where the determination unit determines that the image forming apparatus is not performing the printing processing, permit performance by the image forming apparatus of multi-session communication, in which data is transmitted in parallel using a plurality of sessions with an external apparatus,
- and configured to, in a case where the determination unit determines that the image forming apparatus is performing the printing processing, not permit performance by the image forming apparatus of the multi-session communication.

* * * * *